United States Patent
Motta et al.

(10) Patent No.: US 12,026,967 B2
(45) Date of Patent: Jul. 2, 2024

(54) TRAVEL DOCUMENT VALIDATION USING ARTIFICIAL INTELLIGENCE AND UNSUPERVISED LEARNING

(71) Applicant: SECURIPORT LLC, Washington, DC (US)

(72) Inventors: Marcelo Motta, Washington, DC (US); Nathan Thomas Carpenter, Washington, DC (US); Enrique Segura, Washington, DC (US)

(73) Assignee: Securiport LLC, Reston, VA (US)

( * ) Notice: Subject to any disclaimer, the term of this patent is extended or adjusted under 35 U.S.C. 154(b) by 0 days.

(21) Appl. No.: 17/567,731

(22) Filed: Jan. 3, 2022

(65) Prior Publication Data
US 2022/0207901 A1    Jun. 30, 2022

Related U.S. Application Data

(60) Provisional application No. 63/133,179, filed on Dec. 31, 2020.

(51) Int. Cl.
| | |
|---|---|
| *G06V 30/42* | (2022.01) |
| *B42D 25/24* | (2014.01) |
| *G06V 30/413* | (2022.01) |
| *G06V 30/416* | (2022.01) |

(52) U.S. Cl.
CPC .............. *G06V 30/42* (2022.01); *B42D 25/24* (2014.10); *G06V 30/413* (2022.01); *G06V 30/416* (2022.01)

(58) Field of Classification Search
CPC .... G06V 30/40; G06V 30/418; G06V 30/413; G06V 30/416; G06V 30/412; G06V 30/41; G06V 30/42; G06V 40/70
See application file for complete search history.

(56) References Cited

U.S. PATENT DOCUMENTS

| | | |
|---|---|---|
| 7,133,868 B1 | 11/2006 | Ruest |
| 7,702,694 B1 | 4/2010 | Perkins |
| 7,921,036 B1 | 4/2011 | Sharma |
| 8,156,097 B2 | 4/2012 | Cao et al. |
| 8,311,973 B1 | 11/2012 | Zadeh |
| 8,799,282 B2 | 8/2014 | Goldenberg |
| 9,298,777 B2 | 3/2016 | Lawrence |
| 9,501,882 B2 | 11/2016 | Saravanan |
| 9,721,078 B2 | 8/2017 | Cornick et al. |
| 9,723,010 B2 | 8/2017 | Kerr |

(Continued)

OTHER PUBLICATIONS

Subcommittee on Aviation, Aviation Security and Passenger Profiling at United States Airports, 2002, US House of Representatives, p. 5-38. (Year: 2002).

*Primary Examiner* — Margaret G Mastrodonato
(74) *Attorney, Agent, or Firm* — MILES & STOCKBRIDGE P.C.

(57) ABSTRACT

Systems, devices, methods, and instructions for travel document validation, including receiving data for one or more travel documents, generating a set of features for artificial intelligence model training, validating, and testing, upon receiving data for a plurality of travel documents, data from a first subset of travel documents is used to train an artificial intelligence model, a second subset of travel documents is used to validate the artificial intelligence model, and a third subset of travel documents is used to test the artificial intelligence model.

19 Claims, 7 Drawing Sheets

MACHINE LEARNING MODEL - TRAINING AND PREDICTING

(56) References Cited

U.S. PATENT DOCUMENTS

| | | |
|---|---|---|
| 10,049,201 B2 | 8/2018 | Cornick et al. |
| 10,593,003 B2 | 3/2020 | Moreno et al. |
| 10,657,368 B1 | 5/2020 | Edmund |
| 2003/0212651 A1 | 11/2003 | Hosken |
| 2003/0215114 A1 | 11/2003 | Kyle |
| 2003/0225612 A1 | 12/2003 | DeSimone |
| 2004/0064453 A1 | 4/2004 | Ruiz |
| 2004/0078335 A1 | 4/2004 | Calvesio |
| 2004/0199785 A1 | 10/2004 | Pederson |
| 2004/0267412 A1 | 12/2004 | Arnouse |
| 2005/0086088 A1 | 4/2005 | Stiles |
| 2006/0004814 A1 | 1/2006 | Lawrence |
| 2006/0004866 A1 | 1/2006 | Lawrence |
| 2006/0070127 A1 | 3/2006 | Friedlander |
| 2006/0074986 A1 | 4/2006 | Mallalieu |
| 2006/0206351 A1 | 9/2006 | Hodges |
| 2007/0005523 A1 | 1/2007 | Maren |
| 2007/0112713 A1 | 5/2007 | Seaman |
| 2008/0208901 A1 | 8/2008 | Friedlander |
| 2009/0080708 A1 | 3/2009 | Mellen |
| 2009/0150442 A1 | 6/2009 | Barnard |
| 2009/0177606 A1 | 7/2009 | Angell et al. |
| 2009/0254572 A1 | 10/2009 | Redlich |
| 2009/0256675 A1 | 10/2009 | Kerr |
| 2009/0266882 A1 | 10/2009 | Sajkowsky |
| 2010/0153389 A1 | 6/2010 | Angell |
| 2011/0001604 A1 | 1/2011 | Ludlow |
| 2011/0004622 A1 | 1/2011 | Marson |
| 2011/0119218 A1 | 5/2011 | Lay |
| 2012/0123821 A1 | 5/2012 | Rickman |
| 2012/0330959 A1 | 12/2012 | Kretz |
| 2014/0221776 A1 | 8/2014 | Stivoric |
| 2014/0373753 A1 | 12/2014 | Cornick et al. |
| 2015/0286951 A1 | 10/2015 | Rigdon |
| 2017/0103260 A1 | 4/2017 | Eckel |
| 2017/0154314 A1 | 6/2017 | Mones |
| 2017/0206557 A1 | 7/2017 | Abrol |
| 2018/0075563 A1 | 3/2018 | Ananthanpillai |
| 2018/0197001 A1* | 7/2018 | Bender .................. G06F 16/93 |
| 2018/0373952 A1* | 12/2018 | Bui ....................... G06Q 10/10 |
| 2019/0012451 A1 | 1/2019 | Cornick et al. |
| 2019/0019020 A1* | 1/2019 | Flament ............... G06F 18/213 |
| 2019/0031145 A1 | 1/2019 | Trelin |
| 2019/0034747 A1 | 1/2019 | Lupowitz |
| 2019/0311271 A1 | 10/2019 | Li et al. |
| 2019/0372968 A1* | 12/2019 | Balogh ................. G06N 20/00 |
| 2019/0384955 A1* | 12/2019 | Frieser .................. G06V 10/22 |
| 2020/0104585 A1 | 4/2020 | Collinson et al. |

* cited by examiner

EXAMPLE DOCUMENT READER
(RELATED ART)

EXAMPLE PASSPORT DOCUMENT READER
(RELATED ART)

Thermochromic Ink
Images printed with thermochromic ink disappear when activated by heat, creating easily detected overt security features. Red reacts at 36°C; blue at 44°C.

Invisible UV Image
Invisible under normal lighting conditions, UV images become clearly visible when activated by UV light.

Thermochromic Ink

310
300
320
Metallic Effect
330

Metallic Effect
Brilliant colors and a mirror-like appearance give Fasver® metallic inks a highly desirable dual purpose-document security and stunning design. Colors include gold, silver, blue, red, and green.

OVTek® 340
OVTek® is an easily authenticated security feature, employing proprietary Fasver® technology to create a printed pattern composed of two separate graphics with colors that swap instantly based on the angle of view.

Hidden Image 350
Text and images hidden behind thermochromic print are revealed as the heat-activated thermochromic image disappears. Layering features in this manner increases visual appeal and thwarts counterfeiting attempts.

FIG. 3
TRAVEL DOCUMENT SECURITY FEATURES - FIRST EXAMPLE
(RELATED ART)

TRAVEL DOCUMENT
SECURITY FEATURES
- SECOND EXAMPLE
(RELATED ART)

TRAVEL DOCUMENT USING DIFFERENT LIGHTS
(RELATED ART)

TRAVEL DOCUMENT VALIDATION USING ARTIFICIAL INTELLIGENCE AND UNSUPERVISED LEARNING

CROSS REFERENCE TO RELATED APPLICATIONS

This application is a non-provisional application that claims the benefit of U.S. Provisional Application No. 63/133,179, filed on Dec. 31, 2020, the contents of which are herein incorporated by reference in their entirety.

BACKGROUND OF THE INVENTION

Field of the Invention

The embodiments of the present invention generally relate to border control systems, and more particularly, to border control systems that enable travel document validation using artificial intelligence and unsupervised learning.

Discussion of the Related Art

Existing border control systems cannot accurately validate travel documents from a traveler population hailing from nearly 200 countries because each issuing authority (e.g., country or jurisdiction) individually designs and updates identity documents (e.g., passports, travel visas, driver's licenses, identification cards, etc.) for their subjects or citizens. These identity documents frequently contain a substantial amount of discretionary features, such as security markings. Security markings and other features are changed or updated from time-to-time for each type of document.

Although international standards exist for certain document types, such as passports, the international standards are often not relevant to the security markings and other validation features. For example, specific design and security features are frequently not disclosed so as to make counterfeiting more difficult. These features can be complex and difficult for humans to validate, and can include watermarks, filigran and optically variable ink printing, design patterns, and other ink characteristics. In some instances, even non-machine-readable documents such as temporary or emergency passports issued at consulates with handwritten characters provide specific characteristics to identify the authenticity of its origin.

Today's border control systems can only access a limited sub-set of information for validation purposes and cannot keep up with the effort of obtaining new information as numerous issuing authorities sporadically modify their identity documents. As a result, existing automated travel document validation systems are of limited utility and are very inefficient at accurately determining counterfeited travel documents.

SUMMARY OF THE INVENTION

Accordingly, the embodiments of the present invention are directed to travel document validation using artificial intelligence and unsupervised learning that substantially obviates one or more problems due to limitations and disadvantages of the related art.

Systems, devices, methods, and instructions for travel document validation, including receiving data for one or more travel documents, generating a set of features for artificial intelligence model training, validating, and testing, upon receiving data for a plurality of travel documents, data from a first subset of travel documents is used to train an artificial intelligence model, a second subset of travel documents is used to validate the artificial intelligence model, and a third subset of travel documents is used to test the artificial intelligence model.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3 illustrates a first example passport document including a plurality of security features according to the related art.

DETAILED DESCRIPTION OF THE INVENTION

Figure 1:
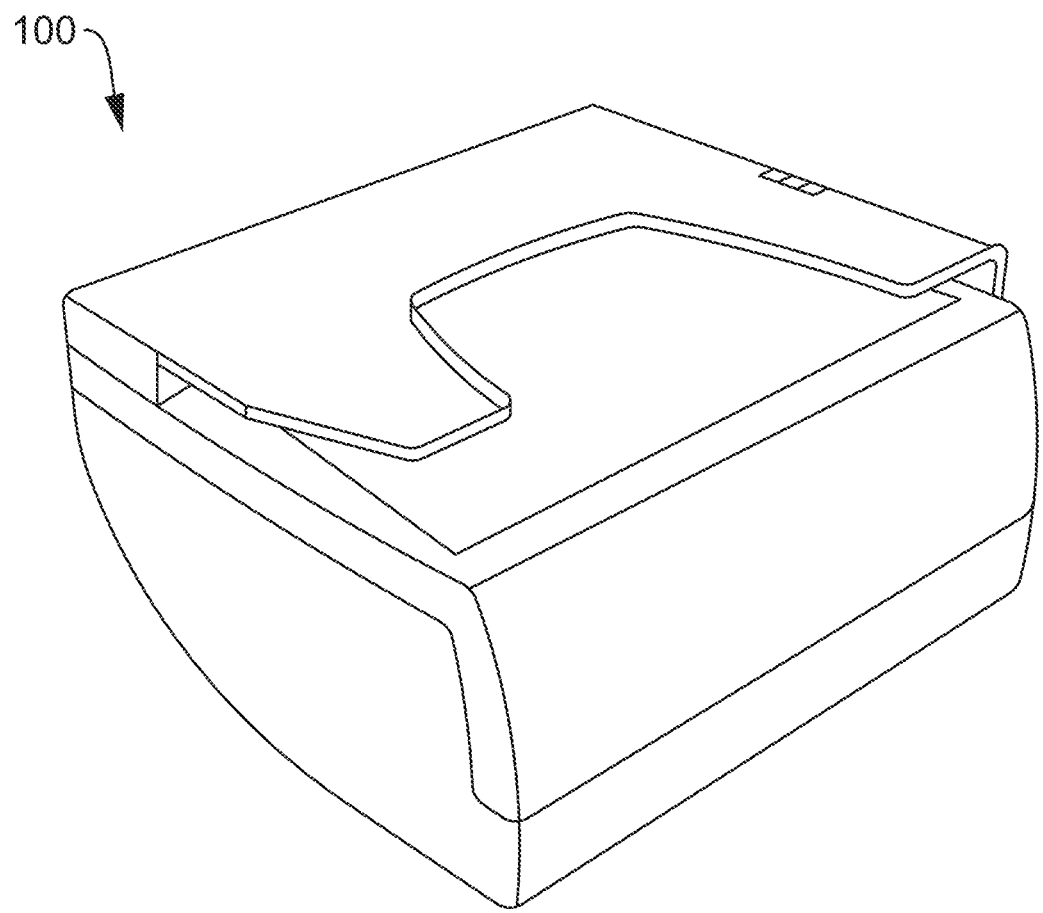
FIG. 1 illustrates an example document reader according to the related art.

Reference will now be made in detail to the embodiments of the present invention, examples of which are illustrated in the accompanying drawings. Wherever possible, like reference numbers will be used for like elements.

Embodiments of user interfaces and associated methods for using a device are described. In some embodiments, the device is an immigration kiosk, border control booth, entry control point, security control point, or the like. The user interface can include a touch screen, document scanner, a gyroscopic or other acceleration device, a fingerprint scanner for fingerprint collection, a camera configured for facial biometric collection, a microphone configured for voice biometric collection, and/or other input/output and biometric devices. In the discussion that follows, an immigration kiosk is used as an example embodiment, but the embodiments of the present invention can be readily applied to other identification or ID validation systems (e.g., event access, building access, etc.).

It should be understood, however, that the user interfaces and associated methods can be applied to other devices, such as a portable communication device such as a mobile phone or tablet. The portable communication device can support a variety of applications, such as wired or wireless communications. The various applications that can be executed on the device can use at least one common physical user-interface device, such as a touchscreen. One or more functions of the touchscreen as well as corresponding information displayed on the device can be adjusted and/or varied from one application to another and/or within a respective application. In this way, a common physical architecture of the device can support a variety of applications with user interfaces that are intuitive and transparent.

At present, the most advanced passport validation systems extract a set of properties from multiple images provided by a document reader and use the extracted information for validation purposes. Properties extracted include full page color image, black and white image, ultra-violet light image, infrared image, green light image, radio-frequency identification (RFID) accessed data, and optical character recognition (OCR) data extracted from the printed characters on the page. Furthermore, these document readers can extract data from one-dimensional and two-dimensional barcodes printed on the page. In addition, these document readers can detect image direction to normalize the scans, and can parse machine readable zone (MRZ) printed text.

In addition, present document reader software generally cross compares the different elements to check consistency against features stored in a pre-stored library and provide those checks results for analysis. Document readers usually include a pre-stored collection of existing publicly known documents around the world provided by the issuing authorities. This collection is provided by international organizations such as International Civil Aviation Organization (ICAO), which disseminates it to authorized parties with the agreement of the issuing authority (usually a nation-state, or special authority such as the UN or Interpol). This update process is largely uncontrolled, and changes with time and involvement of document issuing authorities. Frequently, border control systems cannot access this library to update their system in real-time or even on a periodic or ongoing basis. In addition, this library contains only a small sub-set of information needed for accurate validation. As a result, even the most advanced passport validation systems are prevented from generating alerts when receiving unknown or potentially counterfeit documents since it has no way of analyzing definitively if it's a new type of document, an unregistered but valid document of known type, or a counterfeit document as the reference library information is limited.

In view of the foregoing problems and limitations of even the most advanced passport validation systems, the inventors of the instant application provide systems, devices, methods and instructions that enable travel document validation using artificial intelligence and unsupervised learning. An artificial intelligence (AI) model based on unsupervised and/or semi-supervised machine learning that automatically trains (e.g., generates, develops, builds, monitors, enhances, etc.) models that classify corresponding images and properties extracted from travel documents or other identifying documents is provided. Models are trained using one or more sets of images and properties obtained from several travel documents being processed when persons cross borders while being checked at border control systems, as well as with environmental parameters which can include operational parameters of the collection environment, accuracy requirements, quality of data collected, quantity of data collected, and processing time limitations. The generated models can be monitored to determine when it meets operational requirements and can be reliably used for alerting on anomalies (e.g., an updated identity document having a new feature or a potentially counterfeit identity document). Once the model meets operational minimum requirements, it is versioned and can be used. In some instances the model is used as an additional check for future documents presented.

The embodiments of the present invention can be used at border control types of systems where the presented documentation for travel or identification is inspected and validated. As described above, existing border control systems can use a reference library of travel document properties where information about the different documents issued by different authorities in different countries in different years is stored. However, existing reference libraries present a variety of challenges as they are often incomplete or not updated. In some instances, reference libraries from a number of sources are not maintained. Therefore, the inventors of the instant application have adopted the use of artificial intelligence to improve border control systems. The embodiments evaluate and validate updated identity documents in near real-time by identifying and validating new features on identity documents. By extracting such features from several travelers, new features can be quickly validated, and used to validate a new travel document image being presented and further to identify outliers. If the model cannot properly match the category of the newly presented travel document to previous vast number of travelers under similar characteristics, an alert can be displayed to the officer performing the inspection or to the automated system for further verification and inspection.

The embodiments of the invention enable models to automatically determine from the documents scanned at various communicatively coupled border control points the features of a class of documents (e.g., security features for passports issued by a given country between a first set of dates (e.g., 25 Dec. 2017 and 18 Mar. 2020) as compared to the security features for passports issued by the given country between a second set of dates (e.g., 19 Mar. 2020 and onwards)). When a new document is analyzed for validation with existing methods, the validation result can be cross checked with the AI trained model to determine if an alert needs to be executed on the new traveler(s) based on the model determination that there is a likelihood of an un-conforming travel document for the purpose of further verification and inspection. In addition, once the model has been sufficiently trained and self-validates for operational use, it can become the primary validator, and existing processes used as secondary validation. Usage of the embodiments greatly reduces the validation time required for non-standard documents, or standardized documents with no shared/published specifications.

As part of normal operation of border control systems, documents presented by travelers are scanned by a document reader using several sensors, camera(s) and RFID reader(s) in order to obtain a collection of elements for analysis and validation.

Such document readers can provide via their software development kit (SDK) access to document features that can be used to train the AI model. This also provides a set of characteristics such as Issuing Country or Date of Issue that can be used for classification of extracted properties. Other environmental information can be used as inputs to the model, such as characteristics of the collection environment, accuracy requirements, quality of data collected, quantity of data collected, and processing time.

Document types usually used at border control by travelers include ICAO standard passport (ID-3), Visas (ID-2), ID cards and driving licenses (ID-1), travel and identity documents, boarding passes, and the like.

Document readers can include a combination of hardware and software configured for the operation of and information (e.g., image) retrieval using a camera, UV light, white light, IR light, green light, RFID reader, axial, magnetic stripe reader, and the like. In addition, the document readers are configured to provide a variety of image types including raw images, enhanced images, visible color image, visible black and white image, infrared light image, ultra-violet image, green light image, RFID face image, RFID fingerprint images, RFID iris images, cropped face picture image, cropped security features picture images, cropped 1D and 2D bar code images, cropped stamp images, perforated Document Number image, and the like.

Example properties provided by document readers SDKs include expiration date, MRZ content, 1D and 2D bar codes content, REFID data, OCR text printed, perforated document number, a variety of extractable data, and the like. Example properties can further include UV validation, IR visibility pattern validation, security fibers validation, IPI visualization validation, photo type, security text, text data comparison, MRZ validation, cross validation results, UV paper verification and IR900B printing, and the like.

As alluded to above, features of a class of documents can be based on one or more of the document type, issuing authority, issuing country, issue date, and the like. For example, a class of documents having a first set of security features for passports issued by a given country between a first set of dates as compared to a second class of documents having a second set of security features for passports issued by the given country between a second set of dates.

Figure 2:
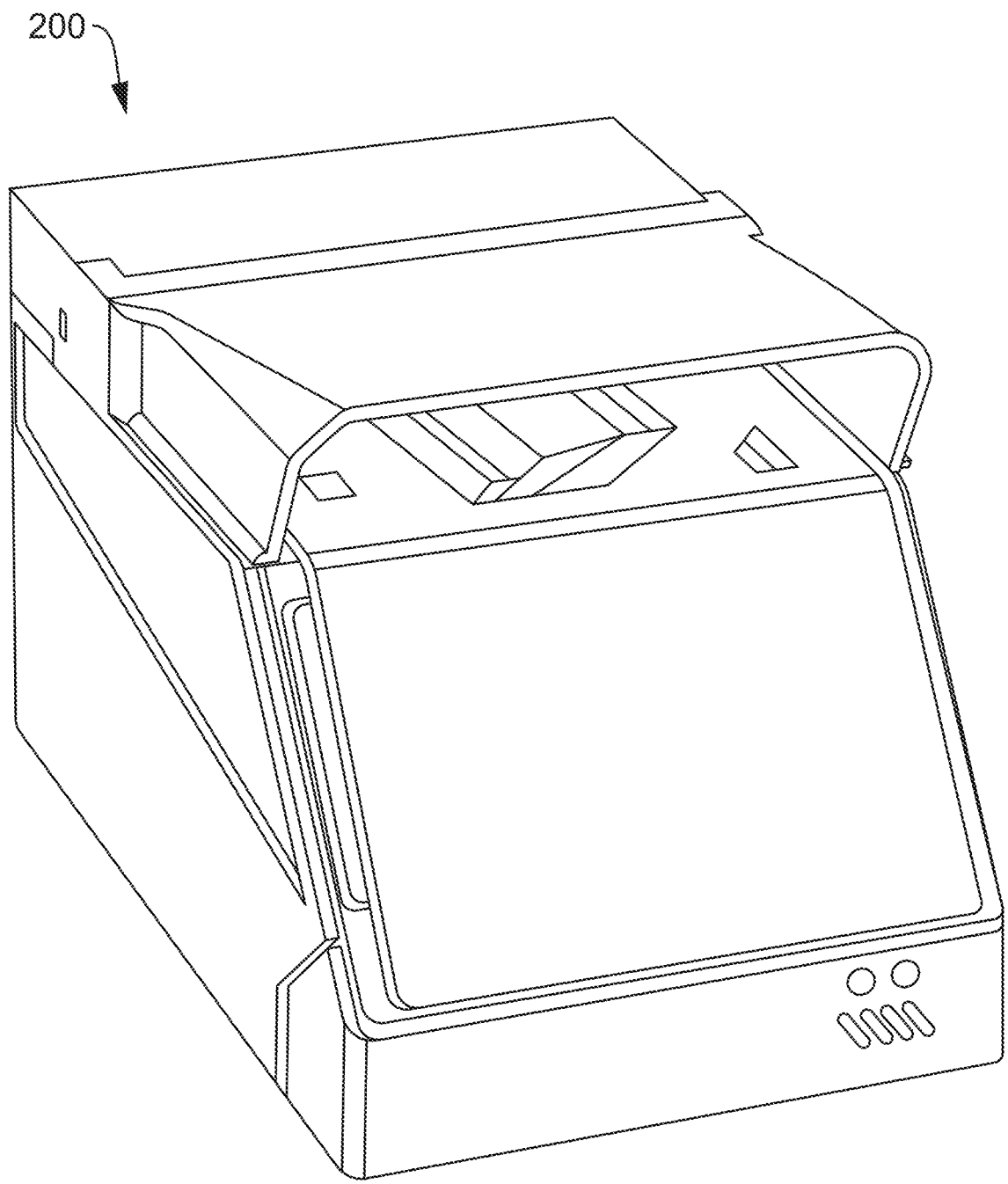
FIG. 2 illustrates an example passport document reader according to the related art.

FIG. 1 illustrates an example document reader 100 according to the related art. FIG. 2 illustrates an example passport document reader 200 according to the related art. In each of FIG. 1 and FIG. 2, respective document reader 100 and passport document reader 200 utilize a camera or other purpose-built imaging device to capture one or more images of the presented identity documents. The captured images by document reader 100 and passport document reader 200 are used for specific image processing tasks, such as data reading and document verification.

FIG. 3 illustrates a first example passport document 300 including a plurality of security features according to the related art. The plurality of security features may include thermochromic ink 310, one or more invisible ultraviolet (UV) images 320, one or more metallic effects 330, OVTek 340, and/or other hidden (but still extractable) images 350. Thermo-chromic ink 310 may be used to print one or more images that disappear when activated by heat, creating easily detected overt security features. For example, red thermochromic ink reacts at 36 degrees Celsius, and blue thermochromic ink reacts at 44 degrees Celsius. One or more invisible ultraviolet (UV) images 320 are invisible under normal lighting conditions, and UV images become visible when activated by UV light. One or more metallic effects 330 produce brilliant colors and mirror-like appearance that is highly desirable and has a dual-purpose of security and design. Colors can include gold, silver, blue, red, and green. OVTek 340 is an easily authenticated security feature employing proprietary technology to create a printed pattern composed of two separate graphics with colors that swap instantly based on the angle of view. One or more hidden images 350 include text and other images hidden behind thermochromic print and are revealed as the heat activated thermochromic image(s) disappears. Layering features in this manner increases visual appeal and thwarts counterfeiting attempts.

Figure 4:
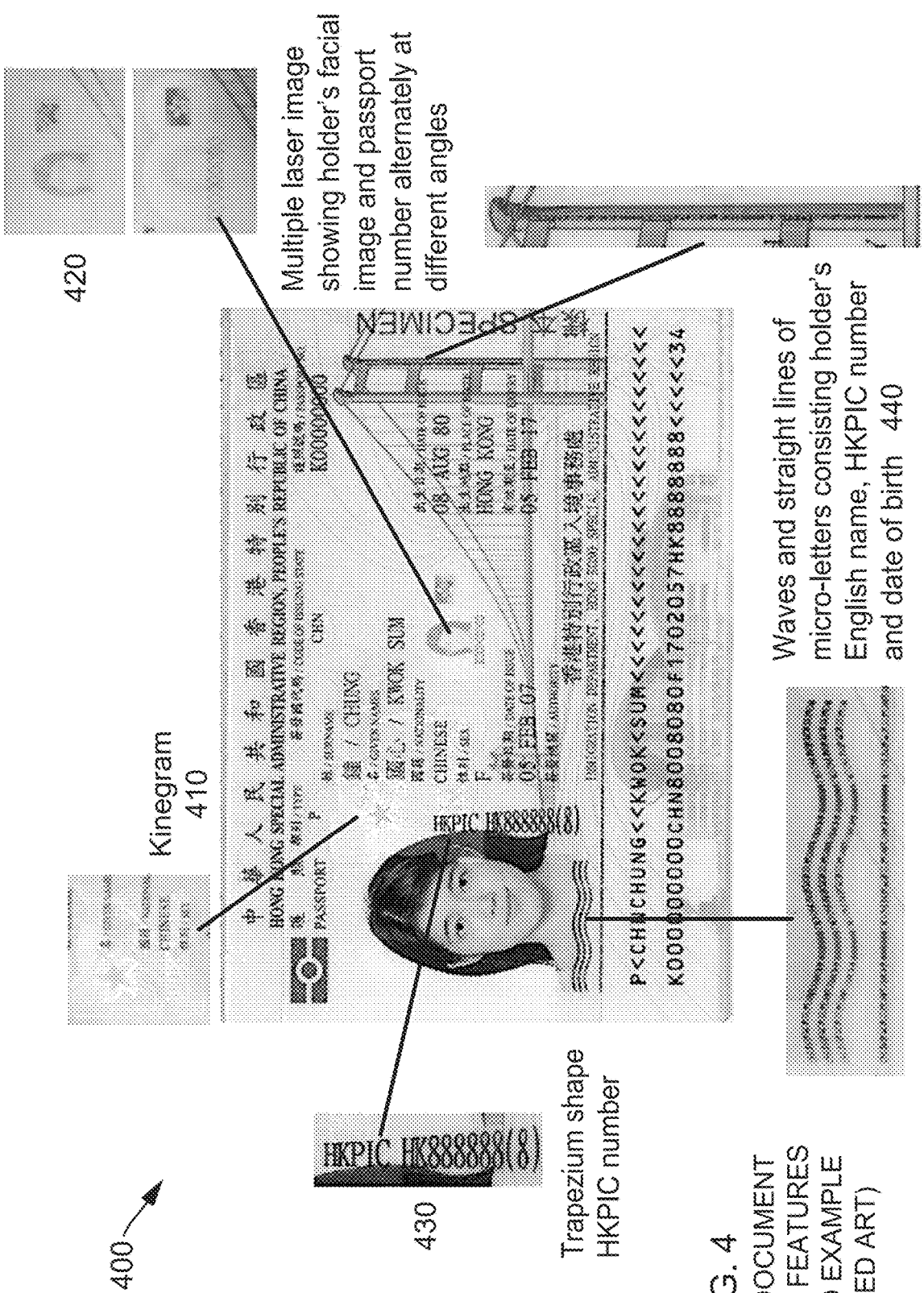
FIG. 4 illustrates a second example passport document including a plurality of security features according to the related art.

FIG. 4 illustrates a second example passport document 400 including a plurality of security features according to the related art. The plurality of security features may include one or more kinegrams 410, one or more laser images 420, one or more trapezium shape identification numbers 430 (e.g., HKPIC), and wave-lined or straight lined microlettering 440.

Figure 5:
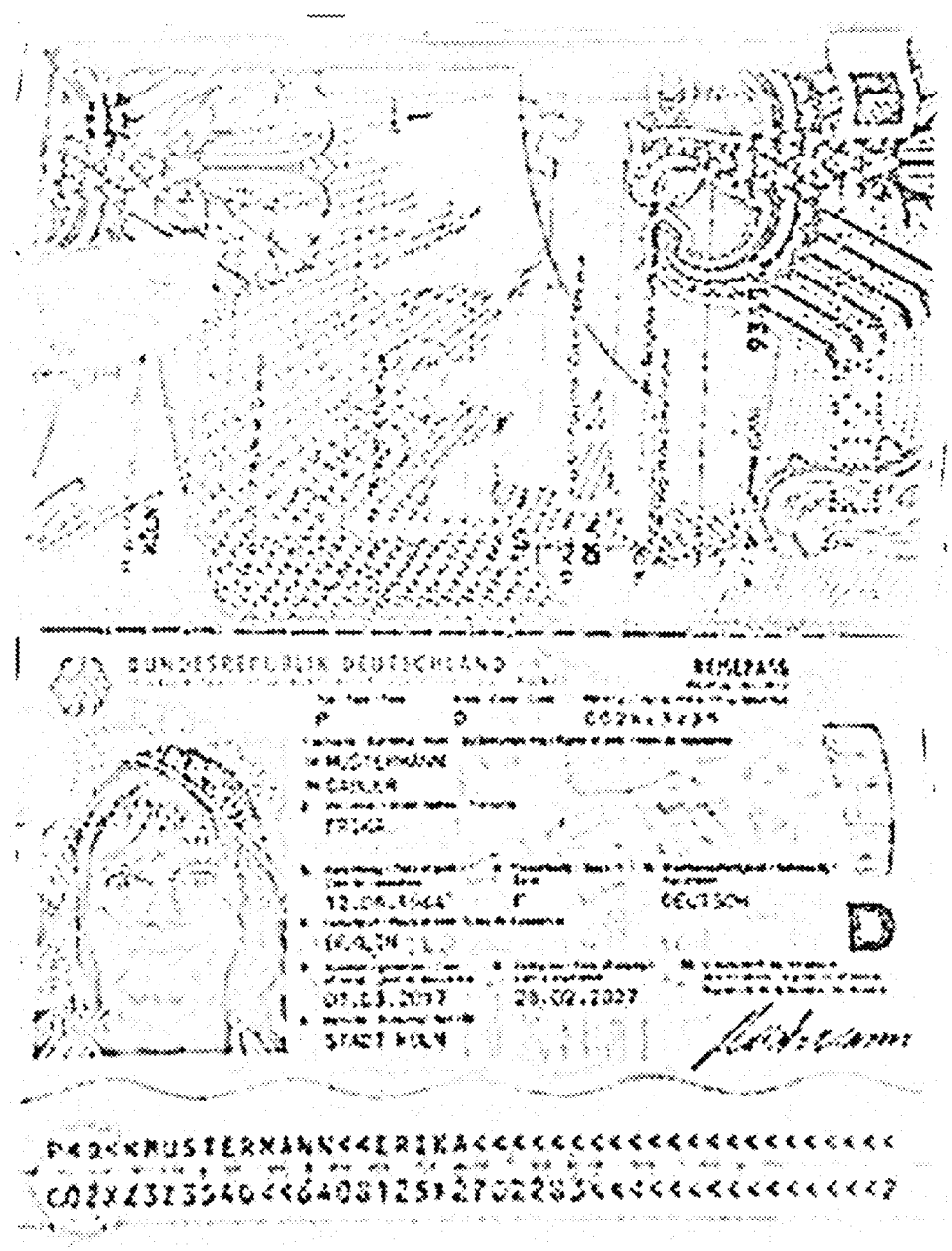
FIG. 5 illustrates a third example passport document including a plurality of security features according to the related art.

FIG. 5 illustrates a third example passport document 500 including a plurality of security features according to the related art. In the example shown in FIG. 5, one or more portions of the passport document 500 may change color in response to different light types or light wavelengths (e.g., ultraviolet light, infrared light, etc.).

Figure 6:
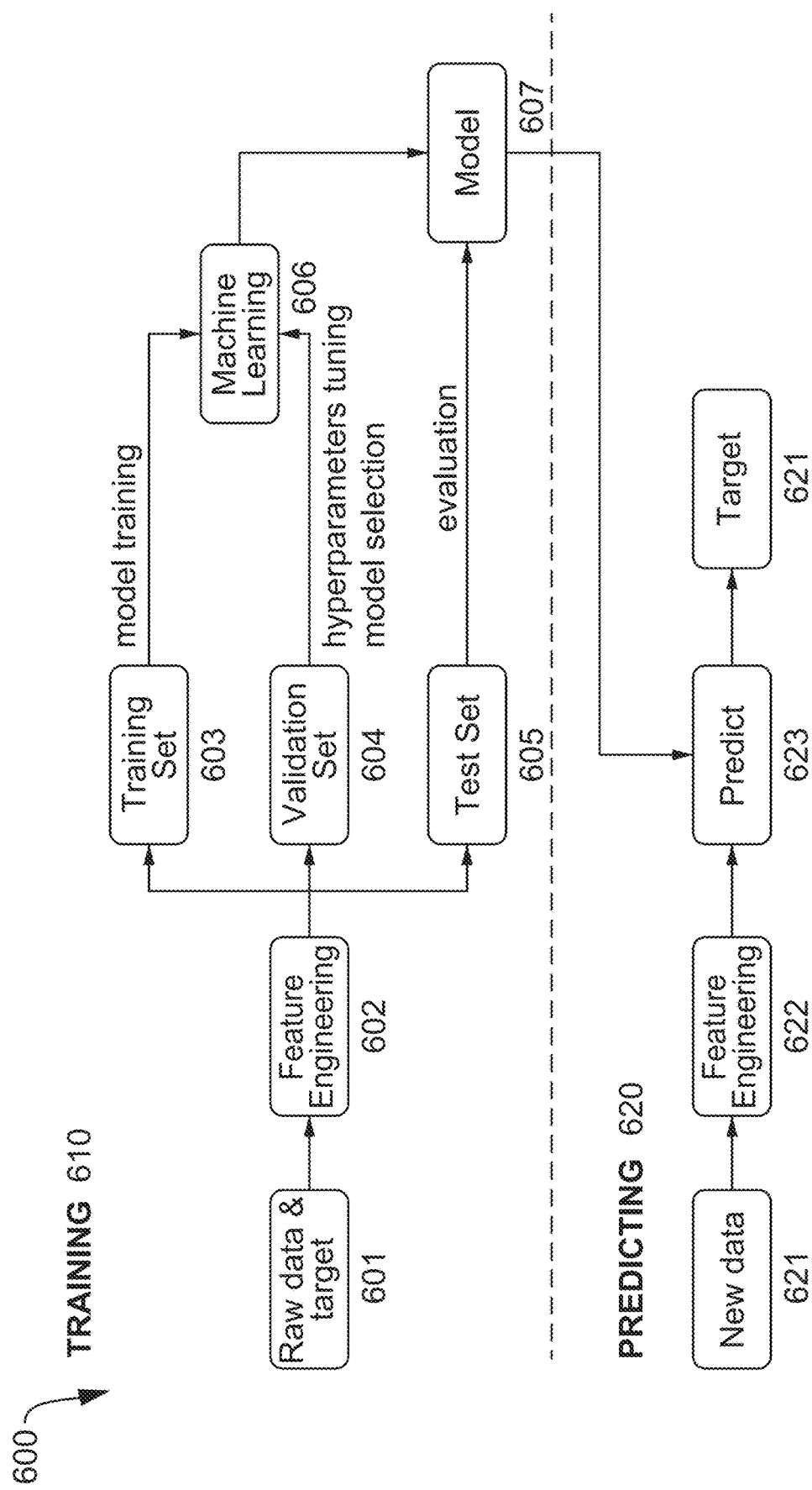
FIG. 6 illustrates a two-stage method for an artificial intelligence learning model according to an example embodiment of the present invention.

FIG. 6 illustrates a two-stage method 600 for an artificial intelligence learning model according to an example embodiment of the present invention. As shown in FIG. 6, there are two stages to the AI learning model: training 610 and predicting 620.

With respect to training stage 610, the AI model receives data for one or more target travel documents, at 601. As discussed above, the received data (e.g., captured, scanned, read, etc.) includes one or more images such as color, black-and-white, ultraviolet, and infrared spectra images. In addition, the received data can further include an RFID (if available) capture data which can include type, issuer, issue date, expiration date, and/or biometrics for validation. Next, the AI model, at feature engineering 602, generates a set of features for model training 603, validation 604, and/or testing 605. The generated set of features can be extracted from the images, extracted sub-images, text, security markings, and other features as available/identifiable. In addition, the generated set of features can be extracted from the other data (e.g., RFID) extract features such as biometric templates, encoded images, and/or checksums as available. Additional data may be used, including any form of extractable data.

Upon receiving data from a plurality of similar travel documents, data from a first subset of travel documents can be used to train the AI model, at 603 (e.g., new security feature added on travel documents after a certain date, or outdated security feature removed from travel documents after a certain date). Subsequently, a second subset of travel documents can be used to validate the AI model, at 604, and a third subset of travel documents can be used to test the AI model, at 605.

Accordingly, machine learning 606 is used to generate the AI model for use against further incoming travel documents. With the receipt of each travel document, the AI model is continuously trained. The machine learning or training can be done in an unsupervised mode where basic classification is done using some features (such as issuing authority and expiration date) and model 607 is completely self-generated; or in a semi-supervised mode where cross-checks by traditional process and/or input of a human agent such as an officer can be used to inform model 607.

With respect to the predicting stage 620, generated AI model 607 is applied to travel documents, including updated or modified travel documents. At the outset, a travel document is received, at 621. The received (e.g., captured, scanned, read, etc.) images include one or more of color, black-and-white, ultraviolet, and infrared spectra. In addition, the received data can further include data captured from an RFID chip (if available) which can include type, issuer, issue date, expiration date, and/or biometrics for validation.

In addition, the received data can further include data from OCR processing (if available) which can include additional properties such as name, gender, nationality, issuance and expiration dates, issuing authorities, and others as printed on the document. Next, the AI model, at feature engineering 622, can generate a set of features for model training, validation, and/or testing. The generated set of features can be extracted from the images, extracted sub-images, text, security markings, and other features as available/identifiable. In addition, the generated set of features can be extracted from the other data (e.g., RFID) extract features such as biometric templates, encoded images, and/or checksums as available.

Next, at 623, the received information for the travel document is compared against the AI model to either validate the document, identify one or more new features for incorporation in the AI model, determine that it is potentially a new document type, determine that it is potentially counterfeit, or to generate an alert that can be displayed to the officer performing the inspection or to the automated system for further verification and inspection.

In some configurations, a pre-trained model can be used so an operator of a border control system starts day 1 with AI model functionality activated without the need of waiting on the training period. Additionally, or alternatively, some configurations use shared trained models from different border control points or authorities for domestic or international collaboration. Since the models contain no extractable information that could be used to reverse-engineer security markings or personally identifiable information (PII), they are generally safe to share.

In some configurations, the AI model can be part of a document reader SDK built-in validation functionalities. Alternatively, the AI model can be hosted as a server-based or cloud-based service for a system to validate the data of a particular traveler document without having to support the training of the model on-premise and the model is configured to be trained with queries coming from different validation authorities.

The use of AI model validation enables the model to automatically and continuously update from the vast majority of travelers traversing at border control point(s). To accurately identify document features, the AI model learns what defined and intrinsic features and properties can be used to establish similarity with known documents. Then, at 624, when a new passport is being analyzed for validation, the new passport can be cross-checked with the AI trained model to determine if an alert needs to be executed on the traveler based on the model knowledge that there is a likelihood of a non-conforming travel document, and further verification and inspection can be required.

Figure 7:
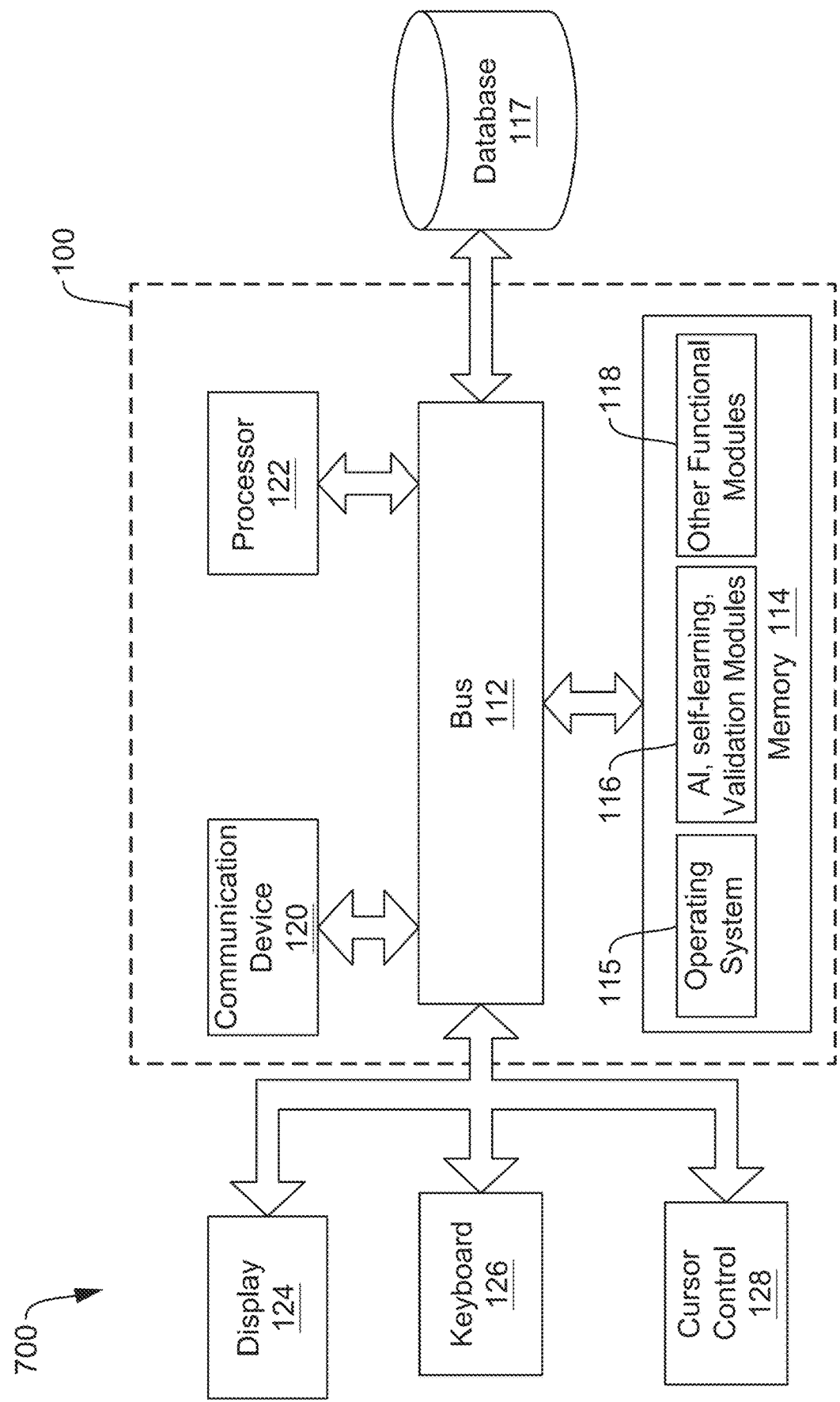
FIG. 7 is a block diagram of a computer server or system in accordance with an example embodiment of the present invention.

FIG. 7 is a block diagram of a computer server system 700 in accordance with an example embodiment of the present invention.

As shown in FIG. 7, system 700 may include a bus 112 and/or other communication mechanism(s) configured to communicate information between the various components of system 700, such as a processor 122 and a memory 114. In addition, a communication device 120 may enable connectivity between processor 122 and other devices by encoding data to be sent from processor 122 to another device over a network and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may comprise one or more general or specific purpose processors to perform computation and control functions of system 700. Processor 122 may include a single integrated circuit, such as a micro-processing device, or may include multiple integrated circuit devices and/or circuit boards working in cooperation to accomplish the functions of processor 122.

System 700 may include memory 114 for storing information and instructions for execution by processor 122. Memory 114 may contain various components for retrieving, presenting, modifying, and storing data. For example, memory 114 may store software modules that provide functionality when executed by processor 122. The software modules may include an operating system 115 that provides operating system functionality for system 700. The software modules may further include artificial intelligence, self-learning, and document validation modules 116 configured to concurrently (e.g., simultaneously) monitor multiple travel document types at manned or automated border control devices or entry control devices, as well as other functional modules 118, as described in connection with the functionality of FIG. 6.

Memory 114 may include a variety of computer-readable media that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory or transitory computer-readable medium.

Processor 122 is further coupled via bus 112 to a display 124, such as a stationary display, wearable display, or augmented-reality glasses. A keyboard 126 and a cursor control device 128, such as a computer mouse, are further coupled to communication device 120 to enable a user to interface with system 700.

System 700 may be part of a larger system. Therefore, system 700 may include one or more additional functional modules, such as functional module 118 to include additional functionality, such as other applications. Other functional modules 118 may include various modules for identifying a person of interest as described in U.S. Patent Application Publication No. 2014/0279640A1 (now U.S. Pat. No. 10,593,003), which is incorporated by reference in its entirety.

A database 117 is coupled to bus 112 to provide centralized storage for travel document types, modules 116 and modules 118 and to store a person's or traveler's identifying and/or threat data. Database 117 may store data in an integrated collection of logically-related records or files. Database 117 may be an operational database, an analytical database, a data warehouse, a distributed database, an end-user database, an external database, a navigational database, an in-memory database, a document-oriented database, a real-time database, a relational database, an object-oriented database, or any other database known in the art.

Although illustrated as a single system, the functionality of system 700 may be implemented as a distributed system. Further, the functionality disclosed herein may be implemented on separate servers or devices that may be coupled together over a network, such as a security kiosk coupled to a backend server. Further, one or more components of system 700 may not be included. For example, system 700 may be a smartphone or tablet device that includes a processor, memory and a display, but may not include one or more of the other components shown in FIG. 7.

It will be apparent to those skilled in the art that various modifications and variations can be made in the travel document validation using artificial intelligence and unsupervised learning of the present invention without departing from the spirit or scope of the invention. Thus, it is intended that the present invention cover the modifications and variations of this invention provided they come within the scope of the appended claims and their equivalents.

We claim:

1. A travel document validation device, the travel document validation device comprising:
   a processor; and
   a non-transitory memory storing one or more programs for execution by the processor, the one or more programs including instructions for:
   receiving data for one or more travel documents;
   generating a set of features for artificial intelligence model training, validating, and testing;
   upon receiving data for a plurality of travel documents, data from a first subset of travel documents is used to train an artificial intelligence model, a second subset of travel documents is used to validate the artificial intelligence model, and a third subset of travel documents is used to test the artificial intelligence model.

2. The travel document validation device according to claim 1, wherein the received data is scanned.

3. The travel document validation device according to claim 1, wherein the received data includes color, black-and-white, ultraviolet, and infrared spectra images.

4. The travel document validation device according to claim 1, wherein the received data includes document type, issuer, issue date, expiration date, and/or biometrics for validation.

5. The travel document validation device according to claim 1, wherein the received data includes an RFID.

6. The travel document validation device according to claim 1, wherein the generated set of features is extracted from images of the one or more travel documents, extracted sub-images, text, and/or security markings.

7. The travel document validation device according to claim 1, wherein the generated set of features can be extracted from biometric templates, encoded images, and/or checksums.

8. A non-transitory computer readable storage medium storing one or more programs configured to be executed by a processor, the one or more programs comprising instructions for:
   receiving data for one or more travel documents;
   generating a set of features for artificial intelligence model training, validating, and testing;
   upon receiving data for a plurality of travel documents, data from a first subset of travel documents is used to train an artificial intelligence model, a second subset of travel documents is used to validate the artificial intelligence model, and a third subset of travel documents is used to test the artificial intelligence model.

9. The non-transitory computer readable storage medium according to claim 8, wherein the received data is scanned.

10. The non-transitory computer readable storage medium according to claim 8, wherein the received data includes color, black-and-white, ultraviolet, and infrared spectra images.

11. The non-transitory computer readable storage medium according to claim 8, wherein the received data includes document type, issuer, issue date, expiration date, and/or biometrics for validation.

12. The non-transitory computer readable storage medium according to claim 8, wherein the received data includes an RFID.

13. The non-transitory computer readable storage medium according to claim 8, wherein the generated set of features is extracted from images of the one or more travel documents, extracted sub-images, text, and/or security markings.

14. A method for operating a travel document validation device, the method comprising:
   receiving data for one or more travel documents;
   generating a set of features for artificial intelligence model training, validating, and testing;
   upon receiving data for a plurality of travel documents, data from a first subset of travel documents is used to train an artificial intelligence model, a second subset of travel documents is used to validate the artificial intelligence model, and a third subset of travel documents is used to test the artificial intelligence model.

15. The method according to claim 14, wherein the received data is scanned.

16. The method according to claim 14, wherein the received data includes color, black-and-white, ultraviolet, and infrared spectra images.

17. The method according to claim 14, wherein the received data includes document type, issuer, issue date, expiration date, and/or biometrics for validation.

18. The method according to claim 14, wherein the received data includes an RFID.

19. The method according to claim 14, wherein the generated set of features is extracted from images of the one or more travel documents, extracted sub-images, text, and/or security markings.

* * * * *